United States Patent
Altenschulte et al.

(10) Patent No.: US 8,058,740 B2
(45) Date of Patent: Nov. 15, 2011

(54) WIND TURBINE CABLE TWIST PREVENTION

(75) Inventors: Markus Altenschulte, Spelle (DE); Andreas Kirchner, Osnabrueck (DE)

(73) Assignee: General Electric Company, Schenectady, NY (US)

( * ) Notice: Subject to any disclaimer, the term of this patent is extended or adjusted under 35 U.S.C. 154(b) by 41 days.

(21) Appl. No.: 12/635,219

(22) Filed: Dec. 10, 2009

(65) Prior Publication Data

US 2011/0133455 A1 Jun. 9, 2011

(51) Int. Cl.
*F03D 9/00* (2006.01)
*G01S 1/00* (2006.01)

(52) U.S. Cl. ..................... 290/44; 342/357.09

(58) Field of Classification Search ............ 290/43, 290/44, 54, 55; 324/357.09; 342/357.09, 342/357.06
See application file for complete search history.

(56) References Cited

U.S. PATENT DOCUMENTS

| | | | | |
|---|---|---|---|---|
| 5,323,322 A | * | 6/1994 | Mueller et al. | 701/215 |
| 6,690,978 B1 | * | 2/2004 | Kirsch | 700/56 |
| 6,694,260 B1 | | 2/2004 | Rekow | |
| 6,876,099 B2 | | 4/2005 | Wobben | |
| 7,052,232 B2 | | 5/2006 | Wobben | |
| 7,126,236 B2 | | 10/2006 | Harbourt et al. | |
| 7,317,260 B2 | * | 1/2008 | Wilson | 290/44 |
| 7,551,130 B2 | * | 6/2009 | Altenschulte | 342/357.4 |
| 2007/0183885 A1 | | 8/2007 | Ormel et al. | |
| 2009/0128402 A1 | * | 5/2009 | Altenschulte | 342/357.1 |
| 2010/0076614 A1 | * | 3/2010 | Nies et al. | 700/287 |
| 2010/0092289 A1 | * | 4/2010 | Altenschulte | 416/9 |
| 2010/0140936 A1 | * | 6/2010 | Benito et al. | 290/44 |

FOREIGN PATENT DOCUMENTS

EP 01301707 B1 10/2007
WO 2004111443 A1 12/2004

* cited by examiner

*Primary Examiner* — Nicholas Ponomarenko

(74) *Attorney, Agent, or Firm* — William F. Heinze; Ernest G. Cusick; Frank A. Landgraff

(57) ABSTRACT

A wind turbine having a nacelle, includes a Global Positioning System ("GPS") sensor for determining a rotational displacement of the nacelle of the wind turbine.

9 Claims, 3 Drawing Sheets

WIND TURBINE CABLE TWIST PREVENTION

CROSS REFERENCE TO RELATED APPLICATIONS

The subject matter disclosed here is generally related to commonly-owned, copending U.S. patent application Ser. Nos. 12/342,146 for "Wind Turbine with GPS Load Control" by Pedro Benito et al filed on Dec. 23, 2008, and 12/342,120 for "Wind Turbine Yaw Bearing Determination" by Timothy E. McCorkendale filed on Dec. 23, 2008 which are each incorporated by reference here in their entirety.

BACKGROUND OF THE INVENTION

1. Technical Field

The subject matter described here generally relates to wind turbines, and, more particularly, to wind turbine cable twist prevention.

2. Related Art

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator or wind power plant.

Wind turbines are typically categorized according to the vertical or horizontal axis about which the blades rotate. One so-called horizontal-axis wind generator is schematically illustrated in FIG. 1 and available from General Electric Company. This particular configuration for a wind turbine 2 includes, a tower 4 supporting a nacelle 6 enclosing a drive train 8. The blades 10 are arranged on a hub 9 to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that receives input from an anemometer 18. A cable 20 extends from the from the generator 14 for providing power to the electrical grid (not shown).

The anemometer 18 often includes a vane or other device for determining wind direction which the control system 16 then uses to rotate the "bearing" of the nacelle 6 on its vertical "yaw" axis in order to position the blades 10 so that they are facing into the wind. Commonly-assigned U.S. Pat. No. 7,126,236 entitled "Methods and Apparatus for Pitch Control Power Conversion" is partially reproduced in FIG. 2 where the control system 16 (from FIG. 1) includes one or more controllers within control panel 112 for overall system monitoring and control including pitch and speed regulation, high-speed shaft and yaw brake application, yaw and pump motor application, and fault monitoring.

The control system 16 provides control signals to the variable blade pitch drive or actuator 114 to control the pitch of blades 10 (FIG. 1) that drive hub 110. The drive train 8 (FIG. 1) of the wind turbine 2 includes a main rotor shaft 116 (also referred to as a "low speed shaft") connected to hub 110 and a gear box 12 that, in some configurations, utilizes a dual path geometry to drive a high speed shaft enclosed within gear box. A high speed shaft from the opposite end of the gear box is used to drive a first generator 120. In some configurations, torque is transmitted via a coupling 122. A yaw system is mounted on a flange provided atop the tower 4.

Yaw drive 124 and yaw deck 126 provide a yaw orientation system for the wind turbine. For example, this yaw orientation system may be electrically operated and controlled by the control system 16 in accordance with information received from anemometer 18. In order to determine the position of the nacelle, mechanical switches (not shown) typically count the number of teeth that are engaged between the yaw drive 124 and the yaw deck 126 as the nacelle 6 is rotated. However, those switches are subject to failure where any disruption of the signals from those switched can cause over-twisting of the cable 20.

BRIEF DESCRIPTION OF THE INVENTION

These and other aspects associated with such conventional approaches are addressed here in by providing, in various embodiments, a wind turbine having a nacelle including a Global Positioning System ("GPS") sensor for determining a rotational displacement of the nacelle of the wind turbine.

BRIEF DESCRIPTION OF THE DRAWINGS

Various aspects of this technology will now be described with reference to the following figures ("FIGs.") which are not necessarily drawn to scale, but use the same reference numerals to designate corresponding parts throughout each of the several views.

DETAILED DESCRIPTION OF THE INVENTION

Figure 1:
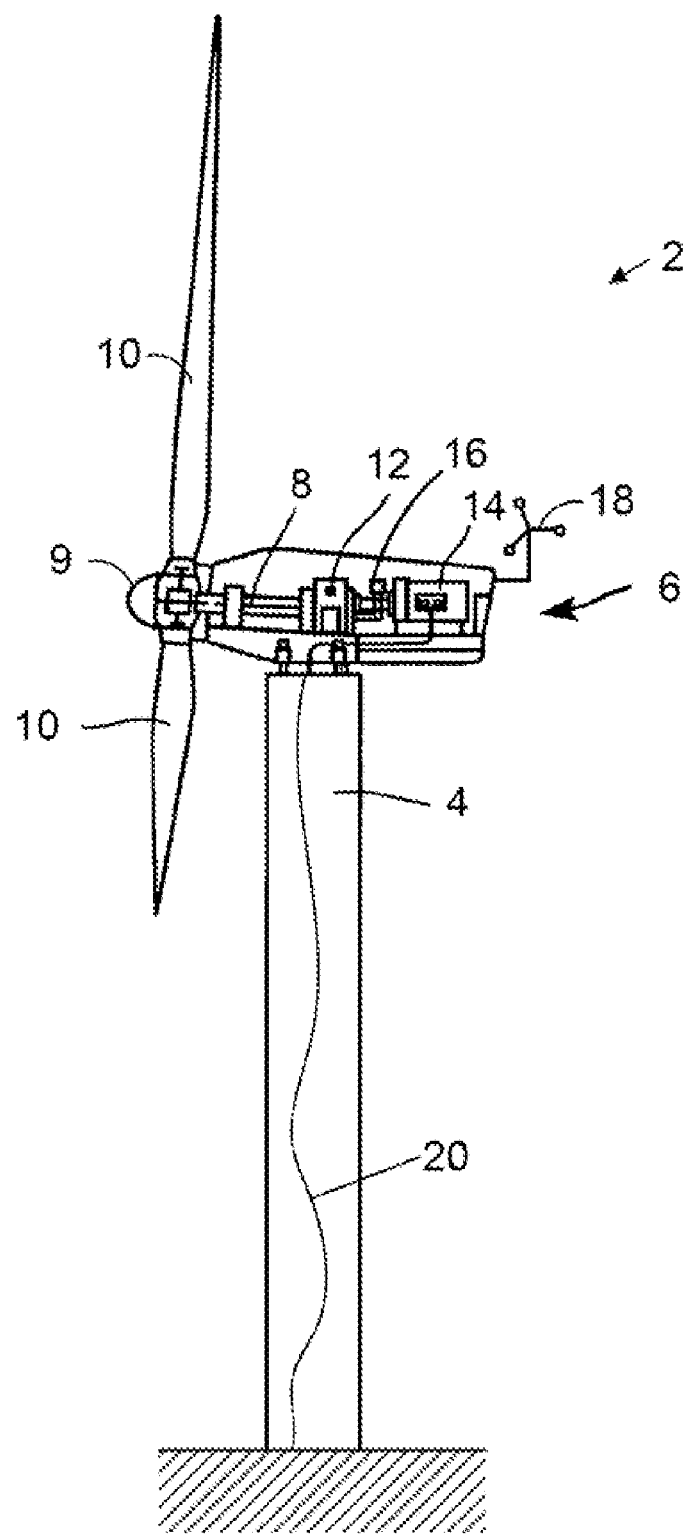
FIG. 1 is a schematic side view of a conventional wind generator.
Figure 2:
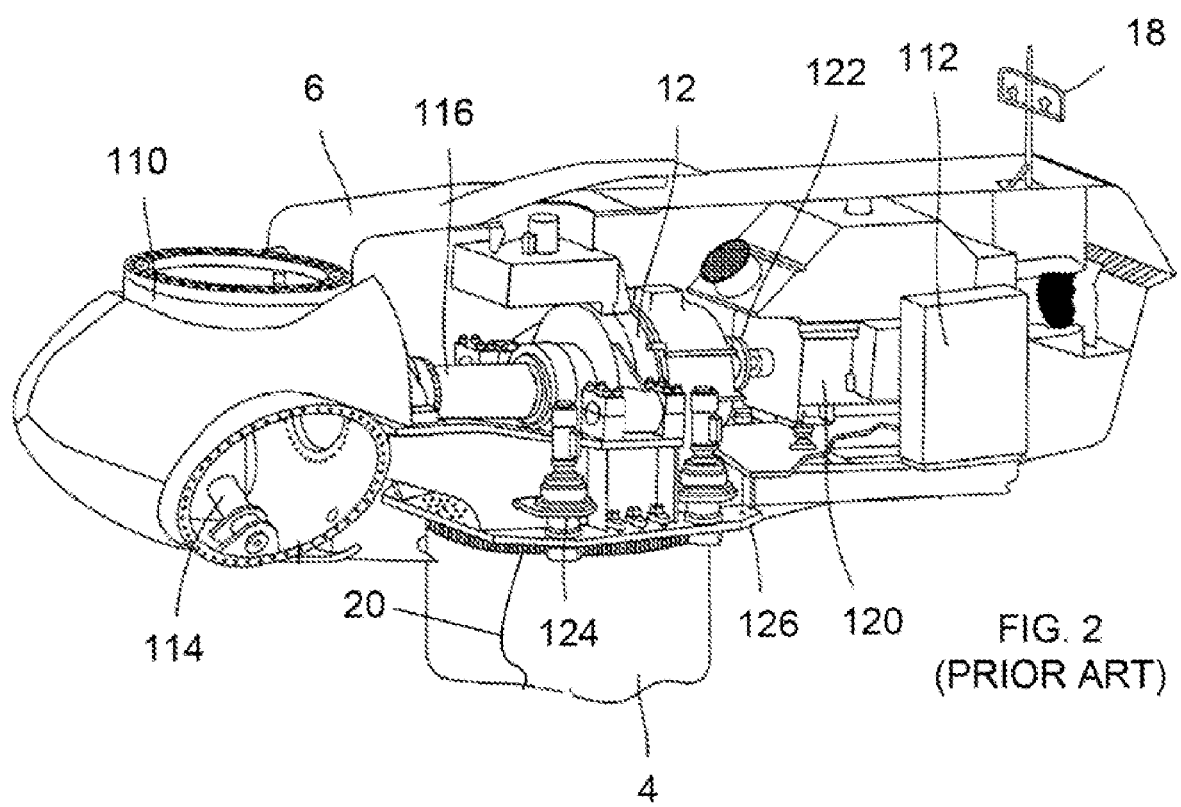
FIG. 2 is a schematic top view of a wind turbine system including the upper portion of the wind generator shown in FIG. 1.

FIG. 1 is a schematic side view of a conventional wind generator 2 while FIG. 2 is a schematic top view of a wind turbine system including the upper portion of the wind generator 2 shown in FIG. 1. The wind turbine illustrated in FIG. 1, or any other wind turbine, may be provided with one or more a Global Positioning System ("GPS") sensors 200 for determining a rotational displacement of the nacelle of the wind turbine. For example, as illustrated in FIG. 3, one or more of the GPS sensors 200 may be provided with one or more GPS receivers 202 that may include, but is not limited to, a sensor for determining horizontal position using the Global Positioning System of global navigation satellites including any of the various augmentation systems, such as Assisted GPS, Differential GPS (e.g., OmiSTAR, StarFire, DGPS, NDGPS), Inertial Navigation Systems, Wide Area Augmentation System, Satellite Band Augmentation System, European Geostationary Navigation Overlay Service, and/or Multi Satellite Augmentation System.

Figure 3:
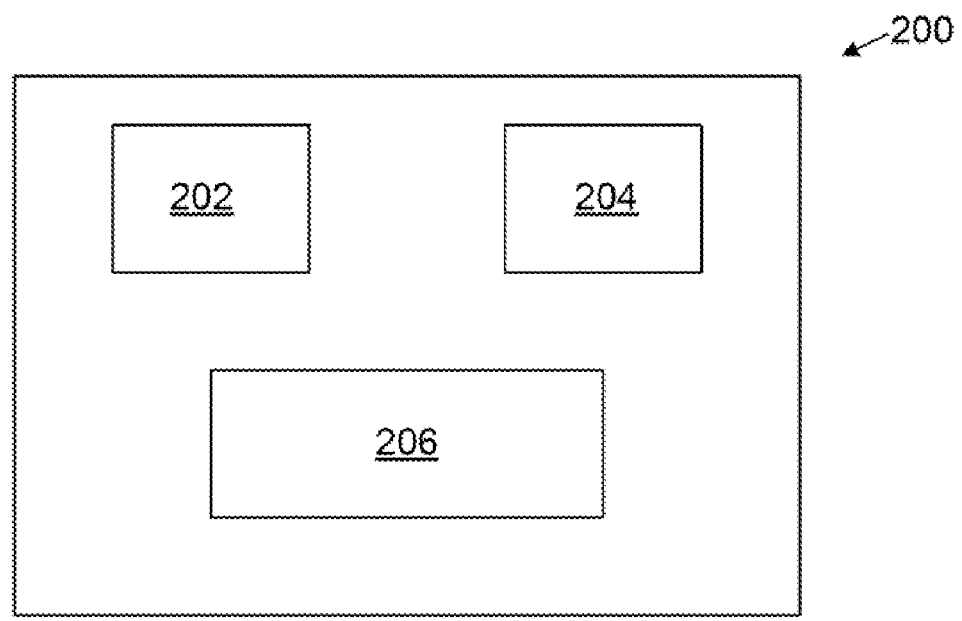
FIG. 3 is a block diagram of a GPS system.

As illustrated in FIG. 3, the GPS receiver 202 may include a GPS compass and/or a GPS position indicator. The GPS receiver(s) 202 will take periodic positional readings and then use that information in order to determine how far the nacelle 6 has rotated from an initial position and/or a previous position at which a reading was taken. A counter 204 may also be provided in order to determine when the nacelle 6 has made a full rotation. In addition, a non-GPS compass 206, such as a magnetic compass or inertial gyroscope, may be provided with the GPS sensor 200 as an alternative, or backup for the GPS receiver(s) 202.

Figure 4:
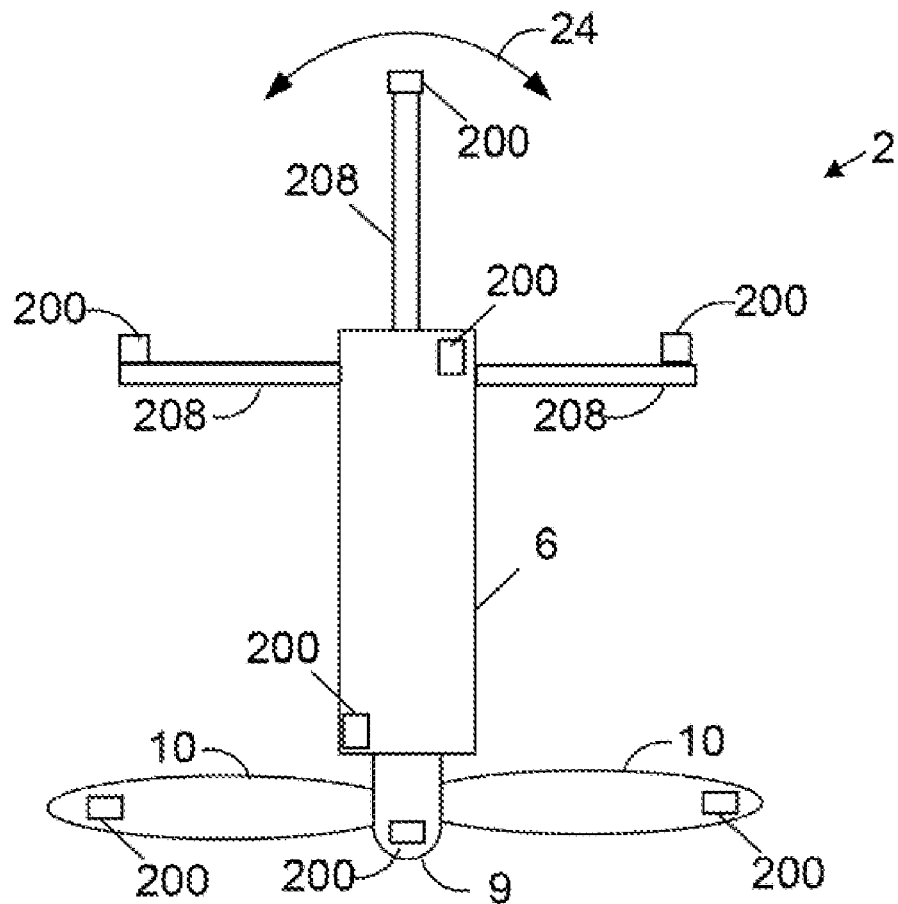
FIG. 4 is schematic top view of the wind turbine from FIG. 1 including the GPS system of FIG. 3.

As illustrated in FIG. 4, one or more GPS sensor(s) 200 may be arranged at various locations, including but not limited to, those illustrated here that move with the yaw bearing of the wind turbine. As discussed in commonly-assigned copending U.S. patent application Ser. No. 12/342,120 for "Wind Turbine Yaw Bearing Determination" by Timothy E. McCorkendale filed on Dec. 23, 2008, the precision of the GPS sensor(s) 200 may be increased with the size of the traced arc 24, or the distance of the GPS sensor(s) arranged as far as possible from the center of yaw rotation of the wind turbine 2. For example, the GPS sensor(s) 200 may be arranged near the front or back of the nacelle 6, in the hub 7, and/or in the blades 10. Alternatively, or in addition, the GPS sensor(s) 200 may be arranged on a boom or extension 208 that further displaces the GPS receiver from the center of yaw rotation of the turbine 2.

Figure 5:
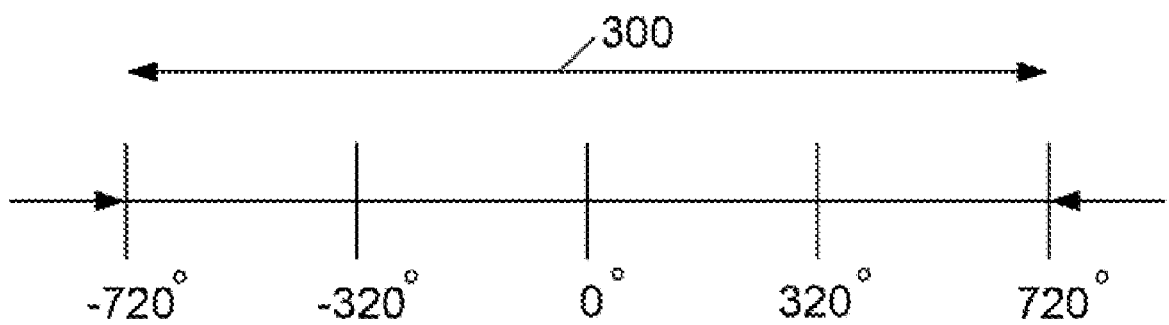
FIG. 5 is a rotational displacement diagram for the wind turbine shown in FIG. 4.

As illustrated in FIG. 5, during normal operation, control system 16 and/or an independent (autarkic) control system causes the nacelle 6 (FIG. 4) to rotate over a predetermined yaw range of rotation 300. Although the predetermined range of rotation is illustrated in FIG. 5 as being between −720° and +720°, any other predetermined range of rotation may also be used in order to protect the cable 20 from being over twisted. When the nacelle 6 rotates past +360° or −360°, the counter 204 will be incremented or decremented in order to track complete revolutions of the nacelle 6. The control system 16 uses information from the GPS receiver 202, counter 204 and/or non-GPS compass 206 to determine when the nacelle 6 has rotated to the end of the predetermined range 300 and then stops and reverses the direction of rotation in order to untwist the cable 20 until the appropriate yaw position is obtained.

In conjunction with an existing, conventional maximum yaw switch, the control system 16 can automatically set the yaw stop positions by rotating the nacelle 6 in one direction until the switch is activated and then reversing the rotation until the switch is activated at the opposite end of the predetermined range 300. The number of turns provided by the counter 204 along with the position provided by the GPS receiver 202 and/or non-GPS compass 206 then provide the set points for the yaw stop positions at the end of the predetermined range 300.

The technology described above offers a various advantages over conventional approaches. For example, it allows for contact-free yaw bearing determination so as to improve system reliability and lower cost. High-maintenance and error-prone conventional gear and direction sensors are not required, thus minimizing the number of components that are otherwise required. The system also allows for self-calibration of the yaw stop and untwist positions. Commissioning is therefore also simplified.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A wind turbine having a nacelle, comprising
    a Global Positioning System ("GPS") sensor for determining a rotational displacement of the nacelle of the wind turbine; and
    a control system for rotating the nacelle in one direction when the nacelle reaches a predetermined rotational displacement in an opposite direction.

2. The wind turbine recited in claim 1, further comprising a counter for determining a number of revolutions of the nacelle.

3. The wind turbine recited in claim 1, further comprising a non-GPS compass for determining a rotational displacement of the nacelle during failure of the GPS sensor.

4. A wind turbine, comprising
    a tower for supporting a nacelle;
    a gearbox connected to an electrical generator arranged on the tower;
    a plurality of blades for rotating the gearbox and driving the generator;
    a control system for rotating the nacelle in one direction when the nacelle reaches a predetermined rotational displacement in an opposite direction; and
    a Global Positioning System ("GPS") sensor for determining a rotational displacement of the nacelle.

5. The wind turbine recited in claim 4, wherein the GPS sensor comprises a GPS compass.

6. The wind turbine recited in claim 4, further comprising a counter for determining a number of revolutions of the nacelle.

7. The wind turbine recited in claim 4, further comprising a non-GPS compass for determining a rotational displacement of the nacelle during failure of the GPS sensor.

8. The wind turbine recited in claim 5, further comprising a counter for determining a number of revolutions of the nacelle.

9. The wind turbine recited in claim 8, further comprising a non-GPS compass for determining a rotational displacement of the nacelle during failure of the GPS sensor.

* * * * *